(12) United States Patent
Kitahara

(10) Patent No.: US 7,144,959 B2
(45) Date of Patent: Dec. 5, 2006

(54) MODIFIER FOR HYDROCARBON POLYMERS, HYDROCARBON POLYMER COMPOSITION AND MOLDINGS

(75) Inventor: Shizuo Kitahara, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/509,022

(22) PCT Filed: Mar. 25, 2003

(86) PCT No.: PCT/JP03/03610

§ 371 (c)(1),
(2), (4) Date: Sep. 27, 2004

(87) PCT Pub. No.: WO03/082934

PCT Pub. Date: Oct. 9, 2003

(65) Prior Publication Data

US 2005/0131149 A1    Jun. 16, 2005

(30) Foreign Application Priority Data

Mar. 28, 2002   (JP) ............................. 2002-090922

(51) Int. Cl.
*C08L 33/06*   (2006.01)
(52) U.S. Cl. ...................... 525/237; 525/240; 525/244
(58) Field of Classification Search ............... 525/237, 525/240, 244
See application file for complete search history.

(56) References Cited

FOREIGN PATENT DOCUMENTS

| JP | 53-136053 A | 11/1978 |
| JP | 57-6462 B2 | 2/1982 |
| JP | 57-145103 * | 8/1982 |
| JP | 57-145103 A | 9/1982 |
| JP | 60-223804 A | 11/1985 |
| JP | 61-126102 A | 6/1986 |
| JP | 61-163904 * | 7/1986 |
| JP | 61-163904 A | 7/1986 |
| JP | 1-197534 A | 8/1989 |
| JP | 2-69545 A | 3/1990 |
| JP | 6-116472 A | 4/1994 |
| JP | 6-172596 A | 6/1994 |
| WO | WO-99/51660 A1 | 10/1999 |

* cited by examiner

*Primary Examiner*—Robert D. Harlan
(74) *Attorney, Agent, or Firm*—Birch, Stewart, Kolasch & Birch, LLP

(57) ABSTRACT

The present invention has a main object to provide a modifier for hydrocarbon polymer that improves a coatability of a surface of a hydrocarbon polymer molding. To attain the object, the present invention provides a modifier for hydrocarbon polymer which contains, as an active component, a modified cyclic structure-containing conjugated diene polymer wherein an amount of an α,β-ethylenically unsaturated carboxylic acid compound bonded by addition is from 0.1 to 20% by weight and a cyclization ratio is from 30 to 95%; and provides a hydrocarbon polymer composition comprising the modifier for hydrocarbon polymer and a hydrocarbon polymer; and provides a molding by molding the hydrocarbon polymer composition.

10 Claims, No Drawings

MODIFIER FOR HYDROCARBON POLYMERS, HYDROCARBON POLYMER COMPOSITION AND MOLDINGS

TECHNICAL FIELD

The present invention relates to a modifier for hydrocarbon polymer and, more particularly, to a modifier for hydrocarbon polymer, which is added in a hydrocarbon polymer thereby to improve coatabilities of the polymer.

BACKGROUND ART

A hydrocarbon polymer, for example, polyolefin resins such as polypropylene and polyethylene, and a polyolefin rubber such as ethylene-propylene copolymer rubber and polybutadiene rubber are inferior to coatabilities even when the surface of moldings thereof are coated or an adhesive is applied thereon because they don't have a polar group.

To solve the above-mentioned problems of the hydrocarbon polymer, there have been proposed a method of adding polyhydroxypolybutadiene wherein 98% or more of double bonds have been hydrogenated (Japanese Patent Application Publication (JP-B) No. 57-6462), a method of adding a hydrocarbon-based polymer ,such as polyhydroxyhydrocarbon polymer, which contains a hydroxyl group at a molecular end (Japanese Patent Application (JP-A) No. 1-197534), and a method of adding a low-molecular polyisoprene wherein 50% or more of double bonds have been hydrogenated (JP-A No. 2-69545). According to these methods, the coatabilities are improved, while mechanical strength such as flexural elasticity is lowered.

Also there have been proposed methods of modifying the surface of olefin-based resins by adding the modifier such as a polycarbonate diol (JP-A No. 6-172596) and a polyetherester diol compound prepared by a ring-opening polymerization of a lactone with ethylene glycol (JP-A No. 6-116472). However, according to these methods using the modifier, coatabilities are not sufficiently improved.

As the method of improving coatabilities, there has been proposed a method of adding, to a polypropylene resin, a polyester having a high molecular weight and a high hydroxyl value, which is obtained from an alicyclic carboxylic acid having a molecular structure wherein carboxyl groups are combined with adjacent two hydrocarbon atoms, and a polyhydric alcohol containing hindered glycol (WO99/51660). However, it has been required to make a further improvement in coatabilities.

DISCLOSURE OF INVENTION

An object of the present invention is to provide a hydrocarbon polymer molding having further improved coatabilities.

The present inventors have intensively studied and found that the adhesion of a hydrocarbon polymer is remarkably modified by adding a conjugated diene polymer, having cyclic structure, which is modified with addition of an α,β-ethylenically unsaturated carboxylic acid compound, and thus the present invention has been completed based on this finding.

The present invention provides a modifier for hydrocarbon polymer comprising, as an active component, a modified cyclic structure-containing conjugated diene polymer wherein an amount of an α,β-ethylenically unsaturated carboxylic acid compound bonded by addition is from 0.1 to 20% by weight and a cyclization ratio is from 30 to 95% as a first invention; a hydrocarbon polymer composition comprising the modifier for hydrocarbon polymer and a hydrocarbon polymer as a second invention; and a molding comprising the hydrocarbon polymer composition as a third invention.

BEST MODE FOR CARRYING OUT THE INVENTION

The modifier for hydrocarbon polymer of the present invention contains, as an active component, a modified cyclic structure-containing conjugated diene polymer wherein an amount of an α,β-ethylenically unsaturated carboxylic acid compound bonded by addition is from 0.1 to 20% by weight and a cyclization ratio is from 30 to 95%.

In the modified cyclic structure-containing conjugated diene polymer used in the present invention, an amount of an α,β-ethylenically unsaturated carboxylic acid compound bonded by addition is from 0.1 to 20% by weight and a cyclization ratio is from 30 to 95%.

The conjugated diene polymer (hereinafter referred to as a polymer (a)) which serves as a basic skeleton of the modified cyclic structure-containing conjugated diene polymer is a polymer having a conjugated diene monomer unit as a main constituent unit. The content of the conjugated diene monomer unit in the polymer (a) is preferably 70% or more by weight, more preferably 80% or more by weight, and particularly preferably 95% or more by weight. Examples of the conjugated diene monomer include 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene. Among these monomers, 1,3-butadiene and isoprene are preferably used and isoprene is more preferably used.

The polymer (a) may be obtained by copolymerizing a conjugated diene monomer with a monomer capable of copolymerizing the conjugated diene monomer. Examples of the monomer capable of copolymerizing the conjugated diene monomer include aromatic vinyl monomers such as styrene, α-methylstyrene, p-isopropylstyrene, p-phenylstyrene, p-methoxystyrene, p-methoxymethylstyrene, p-tert-butoxystyrene, chloromethylstyrene, 2-fluorostyrene, 3-fluorostyrene, pentafluorostyrene, vinyl toluene, vinyl naphthalene, and vinyl anthracene; olefin monomers such as propylene and isobutylene; and nitrile monomers such as acrylonitrile and methacrylonitrile. Among these monomers, an aromatic vinyl monomer is preferable and styrene and α-methylstyrene are more preferable.

The weight average molecular weight of the polymer (a) is preferably from 10,000 to 800,000, more preferably from 30,000 to 500,000, and particularly preferably from 50,000 to 300,000, as measured by gel permeation chromatography (GPC) and expressed in terms of that of polystyrene. When the weight average molecular weight is too small, the hydrocarbon polymer molding has poor coatabilities. On the other hand, when the weight average molecular weight is too large, the viscosity of the modifier for hydrocarbon polymer increases, thus making it difficult to uniformly mix with a hydrocarbon polymer.

The cyclization ratio of the modified cyclic structure-containing conjugated diene polymer is a numerical value which indicates a change in amount of unsaturated bonds due to the internal cyclization reaction of the polymer (a), and the amounts of unsaturated bonds in the polymer (a) structure before and after the internal cyclization reaction can be determined by means of proton NMR according to the methods described in Manfred Gordon et al., Industrial and Engineering Chemistry, Vol. 43, No. 2, p. 386 (1951), Yasuyuki Tanaka et al., J. Polymer Science: Polymer Chemical Edition, Vol. 17, p. 3027 (1979). Specifically, a peak area of proton originating in double bonds in the polymer (a) is measured before and after the internal cyclization reaction. A proportion (X) of the area after the internal cyclization reaction, which means a proportion of double bonds remained in the cyclized product, is determined by comparing to the area before the internal cyclization reaction being 100. Then, the cyclization ratio (%) can be determined by the calculation formula (100–X). The cyclization ratio of the modified cyclic structure-containing conjugated diene polymer used in the present invention is from 30 to 95%, preferably from 50 to 90%, and more preferably from 60 to 85%. Even when the cyclization ratio is too small or large, the hydrocarbon polymer is inferior to coatabilities.

The amount of the α,β-ethylenically unsaturated carboxylic acid compound bonded to the modified cyclic structure-containing conjugated diene polymer by addition means a weight percentage (% by weight) of the α,β-ethylenically unsaturated carboxylic acid compound bonded to the polymer by the addition reaction due to modification before and after cyclization, and can be determined from an acid value of the polymer according to the following calculation equation.

Content=acid value/(molecular weight of potassium hydroxide [56.11]×1000)×(molecular weight of α,β-ethylenically unsaturated carboxylic acid compound/n)×100 (unit: % by weight, n: valence of carboxylic acid)

In case of maleic acid which is usually used as α,β-ethylenically unsaturated carboxylic acid compound, the content is approximately 0.103×acid value (% by weight).

The acid value is indicated by the weight (mg) of potassium hydroxide used to neutralize an acid per 1 g of the modified cyclic structure-containing conjugated diene polymer, and can be determined by titration.

The acid anhydride group bonded in the modified cyclic structure-containing conjugated diene polymer is likely to be hydrolyzed in the presence of water and converted into a dicarboxylic acid group. In the modified cyclic structure-containing conjugated diene polymer, an acid anhydride group (I) and a dicarboxylic acid group (II) formed as a result of hydrolysis of the acid anhydride group coexist, due to water in an addition reaction atmosphere or an artificial addition of water. The acid value is measured by titration of the acid anhydride group (I) and the dicarboxylic acid group (II).

The ratio of the acid anhydride group (I) to the total amount of the acid anhydride group (I) and dicarboxylic acid group (II) in the modified cyclic structure-containing conjugated diene polymer is preferably 60% or more by weight, more preferably 70% or more by weight, and particularly preferably 80% or more by weight. The ratio of the acid anhydride group (I) is determined in comparison to a peak intensity ratio of the acid anhydride group and the carboxylic acid group in an infrared spectrum method. As the ratio of the acid anhydride group (I) increases, the modifier for hydrocarbon polymer becomes superior and the resulting hydrocarbon polymer is excellent in coatabilities.

The α,β-ethylenically unsaturated carboxylic acid compound is a compound selected from α,β-ethylenically unsaturated carboxylic acid, its anhydrides, and its esterified compounds. Examples of the α,β-ethylenically unsaturated carboxylic acid compound include α,β-ethylenically unsaturated monocarboxylic acid, α,β-ethylenically unsaturated polyvalent carboxylic acid, α,β-ethylenically unsaturated polyvalent carboxylic anhydride, α,β-ethylenically unsaturated monocarboxylate ester, α,β-ethylenically unsaturated polyvalent carboxylic acid partial ester, and α,β-ethylenically unsaturated polyvalent carboxylic acid complete ester. Examples of the α,β-ethylenically unsaturated monocarboxylic acid include acrylic acid and methacrylic acid. Examples of the α,β-ethylenically unsaturated polyvalent carboxylic acid include maleic acid, fumaric acid, itaconic acid, and crotonic acid. Examples of the α,β-ethylenically unsaturated polyvalent carboxylic anhydride include maleic anhydride, itaconic anhydride, and aconitic anhydride. Examples of the α,β-ethylenically unsaturated monocarboxylate ester include ethyl acrylate and butyl methacrylate. Examples of the α,β-ethylenically unsaturated polyvalent carboxylic acid partial ester include monoethyl maleate and monomethyl fumarate. Examples of the α,β-ethylenically unsaturated polyvalent carboxylic acid complete ester include diethyl maleate and dimethyl fumarate. Among these compounds, α,β-ethylenically unsaturated polyvalent carboxylic anhydride is preferable and maleic anhydride is more preferable.

The weight average molecular weight of the modified cyclic structure-containing conjugated diene polymer is preferably from 5,000 to 600,000, more preferably from 22,000 to 370,000, and particularly preferably from 37,000 to 230,000, as measured by gel permeation chromatography and expressed in terms of that of polystyrene.

The method of producing a modified cyclic structure-containing conjugated diene polymer includes is not limited particularly. Examples are that (1) a method of conducting an addition reaction of a cyclized product, which is obtained by an internal cyclization reaction of a polymer (a) (hereinafter referred to as a cyclized product (A1)), with an α,β-ethylenically unsaturated carboxylic acid compound, or (2) a method of conducting an internal cyclization reaction of an addition reaction product which is obtained by adding an α,β-ethylenically unsaturated carboxylic acid compound to the polymer (a) (hereinafter referred to as an adduct (A2)). Since it is easy to conduct the internal cyclization reaction, the method of conducting the addition reaction of the cyclized product (A1) with the α,β-ethylenically unsaturated carboxylic acid compound is preferable.

The method of conducting the internal cyclization reaction of the polymer (a) or the adduct (A2) is not specifically limited and, for example, the cyclization catalyst may be contacted with the conjugated diene polymer in an inert solvent according to a conventionally known method. Examples of the inert solvent include aromatic hydrocarbons such as benzene, toluene, xylene, and ethylbenzene; saturated hydrocarbons such as n-pentane, n-hexane, n-heptane, n-octane, n-nonane, and n-decane; and alicyclic hydrocarbons such as cyclopentane, cyclohexane, cycloheptane, and cyclooctane. Among these solvents, hydrocarbons having a boiling point 70° C. or more are preferable. Examples of the cyclization catalyst include sulfuric acid; organic sulfonic acids such as fluoromethanesulfonic acid, difluoromethanesulfonic acid and p-toluenesulfonic acid, and organic sulfonic acid compounds such as anhydrides and esterified compounds thereof; Friedel-Crafts catalysts (Lewis acid) such as tin tetrachloride and titanium tetrachloride; metal halides such as boron tetrafluoride, boron trifluoride, aluminum chloride, diethylammonium monochloride, aluminum bromide, antimony pentachloride, tungsten hexachloride, and iron chloride; and alkyl aluminum halide/halogenated hydrocarbons such as ethylaluminum dichloride/benzyl dichloride.

The reaction temperature, the reaction time, and the ratio of the amount of the polymer (a) or adduct (A2) to that of the cyclization catalyst should be decided according to the objective cyclization ratio. The reaction temperature is preferably from 20 to 200° C., more preferably from 50 to 150° C., and particularly preferably from 80 to 100° C. The reaction time is preferably from 1 to 20 hours, preferably from 2 to 15 hours, and particularly preferably from 3 to 10 hours.

The reaction conditions of the reaction for the addition of the $\alpha,\beta$-ethylenically unsaturated carboxylic acid compound to the polymer (a) or cyclized product (A1) are not specifically limited and may be set according to conventional ene-addition reaction or graft copolymerization method. The ene-addition reaction or graft copolymerization may be conducted in a solution, a water dispersion, or a solid phase. A radical generating agent may be used to accelerate the reaction. Examples of a radical generating agent include peroxides such as di-tert-butyl peroxide, tert-butyl hydroperoxide, dicumyl peroxide, benzoylperoxide, tert-butylperoxidebenzoate, methyl ethyl ketone peroxide, and di-tert-butyl diperoxyphthalate; and azonitriles such as azobisisobutyronitrile.

To conduct the addition reaction in a solution, for example, a conjugated diene polymer is dissolved in a solvent, which is inert to an $\alpha,\beta$-ethylenically unsaturated carboxylic acid compound, such as toluene or xylene, and then a predetermined amount of the $\alpha,\beta$-ethylenically unsaturated carboxylic acid compound is added and the mixture is reacted under a nitrogen gas flow at 120 to 180° C. for 5 to 20 hours. To accelerate the addition reaction, the radical generating agent may be added in an amount of 2 to 10% by weight to the $\alpha,\beta$-ethylenically unsaturated carboxylic acid compound. The amount of the $\alpha,\beta$-ethylenically unsaturated carboxylic acid compound to be added may be decided taking account of the reaction efficiency in the addition reaction.

The solid phase reaction can be conducted by kneading at the reaction temperature of 180 to 200° C. for 2 to 60 minutes using a twin-screw extrusion kneader or a kneader. 5 to 10% by weight of a solvent having high-boiling point may be added to the polymer.

As an active component of the modifier for hydrocarbon polymer, the modified cyclic structure-containing conjugated diene polymer which is further hydrogenated may be used.

The hydrogenation method is not specifically limited and may be conducted by contacting the modified cyclic structure-containing conjugated diene polymer with hydrogen in the presence of a hydrogenation catalyst according to a conventionally known method. The hydrogenation catalyst may be any catalyst, which is used to hydrogenate an olefin compound, and examples of usable heterogeneous catalyst include nickel, palladium, and platinum, and solid catalysts obtained by supporting these metals on carriers such as carbon, silica, diatomaceous earth, alumina, and titanium oxide. As a homogeneous catalyst, those containing metals belonging to group VIII of the Periodic Table can be used. The conditions of the hydrogenation reaction can be selected from the temperature within a range from 0 to 200° C., and preferably from 20 to 150° C., under a hydrogen pressure of 1 to 150 atm, according to the kind of the catalyst.

The modifier for hydrocarbon polymer of the present invention may contain additives, which are usually added in the hydrocarbon polymer, other than the modified cyclic structure-containing conjugated diene polymer. Examples of the additive include antioxidants such as phosphorus-based, phenol-based, and sulfur-based; ultraviolet absorbers such as hinderedamine-based, benzotriazole-based, and benzoate-based; fiber reinforcements such as glass fibers and polyamide fibers; metal compounds such as oxides of iron, chromium, nickel, cobalt, zinc, and titanium; fillers such as carbon black, talc, and silica; colorants such as thioindigo red, phthalocyanine blue, quinacridon red, quinophthalo yellow, condensed azo yellow, and ultramarine blue; dispersants such as calcium stearate and magnesium stearate; waxes; plasticizers; conductivity imparting agents; antistatic agents; foaming agents; crosslinking agents; flame retardants; and oils. The modifier in the form of a masterbatch may be prepared by adding a hydrocarbon polymer.

The content of the modified cyclic structure-containing conjugated diene polymer in the modifier for hydrocarbon polymer is not specifically limited. The content may be decided according to the amount of the modified cyclic structure-containing conjugated diene polymer to be added in the hydrocarbon polymer and is preferably from 1 to 100% by weight, more preferably from 5 to 100% by weight, and particularly preferably from 10 to 100% by weight.

The hydrocarbon polymer composition of the present invention comprises a hydrocarbon polymer and the above-mentioned modifier for hydrocarbon polymer.

The hydrocarbon polymer used in the present invention preferably has a hydrocarbon monomer unit in the content of 70% or more by weight, more preferably 85% or more by weight, most preferably 95% or more by weight. When the content of the hydrocarbon monomer unit is less than the above range, the proportion of atoms other than carbon and hydrogen atoms in the polymer structure is large and the polarity increases. As a result, the resulting composition has sufficient coatabilities, and thus it is not necessary to add the above modifier for hydrocarbon polymer.

Examples of preferable hydrocarbon polymer include polyolefin-based resin, polystyrene-based resin, polydiene-based resin, polyolefin-based rubber, and polydiene-based rubber. The effect of the present invention is exerted efficiently when a polyolefin-based resin or a polyolefin-based rubber is used.

Examples of the polyolefin-based resin include polyethylene resin, polypropylene resin, polybutylene resin, and ethylene-propylene copolymer resin.

Examples of the polystyrene-based resin include polystyrene resin and poly-p-xylylene resin.

Examples of the polydiene-based resin include trans-1,4-isoprene resin, 3,4-polyisoprene resin, trans-1,4-polybutadiene resin, and 1,2-polybutadiene resin.

Examples of the polyolefin-based rubber include ethylene-propylene copolymer rubber, ethylene-propylene-ethylidene norbornene copolymer rubber, and butyl rubber.

Examples of the polydiene-based rubber include polybutadiene rubber and polyisoprene rubber.

With regard to a ratio of the amount of the hydrocarbon polymer to that of the modified cyclic structure-containing conjugated diene polymer in the hydrocarbon polymer composition of the present invention, the amount of the modified cyclic structure-containing conjugated diene polymer is preferably from 0.01 to 50 parts by weight, more preferably from 0.1 to 30 parts by weight, and particularly preferably from 1 to 25 parts by weight, in comparison to 100 parts by weight of the hydrocarbon polymer. The modifier for hydrocarbon polymer containing the modified cyclic structure-containing conjugated diene polymer as an active component may be added to the hydrocarbon polymer so that the amount of the modified cyclic structure-containing conjugated diene polymer is within the above range.

If necessary, the hydrocarbon polymer composition of the present invention may contain additives which are usually added in the resin and rubber. Examples of the additive include reinforcers such as carbon and silica; fillers such as talc and clay; and stabilizers such as antioxidants and weathering stabilizers. When the hydrocarbon polymer is a rubber, vulcanizing agents and vulcanization accelerators may be added.

The order and method for addition of the modifier for hydrocarbon polymer and various additives are not specifically limited and may be conducted in the same manner as in the case of addition of the conventional resin and rubber. After adding the additive capable of reacting at high temperature, like the vulcanizing agent, it may be treated at the temperature lower than the reaction temperature.

A molding of the present invention is obtained by molding the above hydrocarbon polymer composition. When the hydrocarbon polymer is a rubber, vulcanization may be conducted on and after molding. After molding, the shape may be modified by cutting.

The method of molding the hydrocarbon polymer composition is not specifically limited and examples thereof include injection molding method, hollow molding method, extrusion molding method, compression molding method, and rotational molding method. When the hydrocarbon polymer is a rubber and vulcanization is conducted, it may be heated to the temperature higher than the temperature where the vulcanizing agent reacts in the presence of the vulcanizing agent.

The surface of the molding of the present invention is coated with a covering material such as coating material or adhesive, a covered layer made of the covering material is firmly bonded to the surface of the molding. The covering material preferably contains a heat-hardening resin as a main component.

The coating material containing heat-hardening resin as a main component is prepared by optionally adding organic solvents, drying oils, pigments, plasticizers, stabilizers and aggregates to the heat-hardening resin, and preferred examples thereof include epoxy-based resin coating materials, acrylic-urethane-based resin coating materials, polyurethane-based coating materials, alkyd-melamine-based resin coating materials, polyester-melamine-based resin coating materials, and polyether-melamine-based resin coating materials. Among these coating materials, polyurethane-based coating materials, polyester-melamine-based resin coating materials, and polyether-melamine-based resin coating materials are particularly preferable.

The adhesive containing a heat-hardening resin as a main component is prepared by optionally adding hardeners and solvents, and, if necessary, various additives in the heat-hardening resin and preferred examples thereof include epoxy-based adhesives, urethane-based adhesives, acrylic-based adhesives, and cyano acrylate-based adhesives. Among these adhesives, epoxy-based adhesives and urethane-based adhesives are particularly preferable. Solvents to be added in these adhesives may be aqueous and non-aqueous solvents.

When the covering material is an adhesive, examples of the adherend to be adhered with the molding of the hydrocarbon polymer composition include the hydrocarbon polymer composition of the present invention, the polymer having a polarity, metals, ceramics, timbers, concretes, and leathers.

The method of covering the surface of the molding of the present invention with the covering material is not specifically limited and, for example, electrostatic coating, air-spray coating, brush coating and roller coating can be employed. The coating may be effected by conducting a prime-coating and then a final coating.

In case of a covering material containing a heat-hardening resin as a main component, hardening may be conducted after coating. When a covering material containing a heat-hardening resin as a main component is an adhesive, a molding is firmly bonded with an adherend by bonding with the bonding portion of the adherend via an adhesive at the bonding portion of the molding, and by hardening the adhesive. The method of hardening the covering material is suitably selected depending upon the material and shape of the molding, and the nature of the covering material. In case of the adhesive, the hardening method is decided taking account of the material of the adherend to be bonded with the hydrocarbon polymer. For example, natural drying, and the heating using heated air, infrared light, high-frequency (UHF) can be employed. The thickness of the covering material containing a heat-hardening resin as a main component is suitably selected depending upon the intended use of the molding and is not particularly limited, but is preferably from 1 to 500 μm, more preferably from 3 to 200 μm, and particularly preferably from 5 to 100 μm, in the case of using as the coating material. In case of using as the adhesive, the thickness is usually from 1 to 1000 μm, preferably from 5 to 500 μm, and particularly preferably from 10 to 200 μm.

By making use of the above-mentioned properties, the molding of the present invention is useful for electrical and electronic components and automobile components; packaging materials such as bag and sheet; and containers for beverage and cosmetics. The molding of the present invention is particularly useful for automobile exterior materials such as bumper, mud guard, weather strip, and glass run channel; and automobile interior materials such as instrument panel, grommet, and airbag.

EXAMPLES

The present invention will now be described by the following examples that by no means limit the scope of the invention. In the following examples, parts and % are based on weight unless otherwise specified. Operations and tests for evaluation were conducted by the following procedures.

(1) Weight Average Molecular Weight of Polymer

The weight average molecular weight of a polymer was measured by gel permeation chromatography (GPC) and expressed in terms of that of the standard polystyrene.

(2) Cyclization Ratio of Cyclized Product of Conjugated Diene Polymer

Peak areas of proton attributable to double bonds of a conjugated diene polymer before and after the internal cyclization reaction were measured by proton NMR analysis. Using the above-mentioned calculation method, a proportion (%) of double bonds remained in the cyclized product in the case of the proportion before the internal cyclization reaction being 100% was determined, and [100—the proportion of double bonds remained in the cyclized product] was taken as a cyclization ratio (%).

(3) Amount of Maleic Anhydride Bonded to Modified Cyclic Structure-containing Conjugated Diene Polymer by Addition The amount of maleic anhydride bonded to the modified cyclic structure-containing conjugated diene polymer by addition was determined by the following procedure.

According to the method described in "Standard Methods for the Analysis of Fats, Oils and Related Materials" (the Japan Oil Chemists' Society) 2,4,1–83, an acid value of a polymer immediately after the addition reaction of maleic anhydride was measured. A carboxyl group content when an acid anhydride group is converted into a carboxyl group was determined based on the acid value, and then the amount of maleic anhydride bonded by addition was determined.

(4) Test for Adhesion of Coating Material to the Surface of Molding

After diluting a two-coat one-bake urethane coating material to a predetermined viscosity (10 to 12 seconds/Iwata Cup NK-2 viscometer) using thinner, the resulting solution is spray-coated (spray gun diameter: 1.0 to 1.3 mm, spraying pressure: 3.5 to 5.0 kg/cm$^2$) on an injection-molded plate (3 mm in thickness×50 in width×80 in length) and then sufficiently dried. A test piece having lattice pattern is made according to a cross-cut method described in JIS K5400 and, after adhering a cellophane tape (manufactured by NICHIBAN CO., LTD.) on the lattice pattern, the tape is removed by rapidly pulling in a vertical direction. The number of squares remaining without separation per 100 squares is counted. The larger the numerical value is, the better the adhesion of the coating material is.

(5) Solvent Resistance Test

A test piece (3 mm in thickness×15 mm in width×30 mm in length) was cut from a coated product and beveled. The sample was immersed in thinner at 23° C. and the period of time from the commencement of immersion to the time at which partial separation of the coating film was observed. The larger the numerical value is, the better the solvent resistance is.

(6) Test of Adhesion of Coating Material Coated on Surface of Molding

Gauze was adhered to the coated surface of a molding by using an instant adhesive, and then, cut into a strip-shaped sample (2 mm in thickness×1 cm in width×10 mm in length). A portion of gauze which is adhered to one end of the test piece was removed, and the gauze and molding were pulled in an opposite direction at an angle of 180° and a rate of 200 mm/min, and the maximum strength (in kgf/cm) required for separation was measured. The larger the numerical value is, the better the adhesion between the coating film of the coating material and the surface of the molding is.

Reference Example 1

In a four-necked flask equipped with a stirrer, a thermometer, a reflux condenser and a nitrogen gas introducing tube, 100 parts of polyisoprene (comprising 86% of a cis-1,4-isoprene unit, 12% of a trans-1,4-isoprene unit and 2% of a 3,4-isoprene unit, weight average molecular weight: 136,000) and 1570 parts of toluene were charged. After replacing the atmosphere in the flask by nitrogen gas, polyisoprene was completely dissolved in toluene by heating to 85° C. in an oil bath while stirring. Then, 3.9 parts of p-toluenesulfonic acid was added and the internal cyclization reaction was conducted by continuously stirring the solution while maintaining at 85° C. After 5 hours, 400 parts of ion-exchange water was added thereby to terminate the cyclization reaction. After standing for 30 minutes, an oil layer was separated. The oil layer was by washing with 400 parts of ion-exchange water three times and water molecule was removed by centrifugation at 300 rpm. The oil layer was heated to 130° C. thereby to completely remove water molecule.

While stirring the resulting toluene solution containing a cyclized product, 2.5 parts of maleic anhydride was continuously charged over 5 minutes at a given rate. The addition reaction was conducted at the reaction temperature of 160° C. for 40 hours. The cyclized product was precipitated by pouring the reaction solution in 3000 parts of an acetone solution containing 1% of 2,6-di-tert-butylphenol. The resulting precipitate was collected and then dried under reduced pressure to obtain a maleinated isoprene cyclized polymer (hereinafter referred to as a cyclized product A). The cyclization ratio, the weight average molecular weight, and the maleic anhydride content of the cyclized product A are shown in Table 1.

Reference Example 2

In the same manner as in Example 1, except that polyisoprene comprising 73% of a cis-1,4-isoprene unit, 22% of a trans-1,4-isoprene unit and 5% of a 3,4-isoprene unit and having a weight average molecular weight of 107,000 was used and the amount of p-toluenesulfonic acid was replaced by 3.6 parts, the internal cyclization reaction was conducted. In the same manner as in Reference Example 1, except that the amount of maleic anhydride was replaced by 2.0 parts, the modification reaction was conducted to obtain a cyclized product B. The cyclization ratio, the weight average molecular weight, and the maleic anhydride content of the cyclized product B are shown in Table 1.

Reference Example 3

In the same manner as in Example 1, except that polyisoprene comprising 30% of a cis-1,4-isoprene unit, 14% of a trans-1,4-isoprene unit and 56% of a 3,4-isoprene unit and having a weight average molecular weight of 252,000 was used and the amount of p-toluenesulfonic acid was replaced by 3 parts, the internal cyclization reaction was conducted. In the same manner as in Reference Example 1, except that the amount of maleic anhydride was replaced by 2.8 parts, the modification reaction was conducted to obtain a cyclized product C. The cyclization ratio, the weight average molecular weight, and the maleic anhydride content of the cyclized product C are shown in Table 1.

Reference Example 4

In a four-necked flask equipped with a stirrer, a thermometer, reflux condenser and a nitrogen gas introducing tube, 100 parts of polyisoprene (comprising 73% of a cis-1,4-isoprene unit, 22% of a trans-1,4-isoprene unit and 5% of a 3,4-isoprene unit, weight average molecular weight: 107,000) and 1570 parts of toluene were charged. After replacing the atmosphere in the flask by nitrogen gas, polyisoprene was completely dissolved in toluene by heating to 80° C. in an oil bath while stirring. Then, 7.2 parts of maleic anhydride was added and the addition reaction was conducted for one hour while maintaining the solution at 180° C. The reaction solution was poured in 3000 parts of an acetone solution containing 1% of 2,6-di-tert-butylphenol, and the resulting precipitate was collected and then dried under reduced pressure to obtain a maleinated isoprene polymer.

100 Parts of the maleinated isoprene polymer was dissolved again in 300 parts of toluene and 3.2 parts of p-toluenesulfonic acid was poured, and then the internal cyclization reaction was conducted by continuously stirring the solution while maintaining at 85° C. After 5 hours, 400 parts of ion-exchange water was added thereby to terminate the internal cyclization reaction. After standing for 30 minutes, an isolated oil layer was separated. The oil layer was by washing with 400 parts of ion-exchange water three times and poured in 1000 parts of a 1% methanol solution of 2,6-di-tert-butylphenol, and then the precipitate was collected and dried under reduced pressure to obtain a cyclized product D. The cyclization ratio, the weight average molecular weight, and the maleic anhydride content of the cyclized product D are shown in Table 1.

TABLE 1

|  | Reference Examples | | | |
|---|---|---|---|---|
|  | 1 | 2 | 3 | 4 |
| Cyclized products | A | B | C | D |
| Weight average molecular weight | 98,500 | 83,600 | 206,600 | 90,500 |
| Cyclization ratio (%) | 83 | 73 | 68 | 73 |
| Amount of maleic anhydride bonded by addition (%) | 1.8 | 1.3 | 1.5 | 2.3 |

Example 1

After 70 parts of a propylene homopolymer (J-3054HP, manufactured by Idemitsu Petrochemical Co., Ltd.), 20 parts of an ethylene-propylene copolymer rubber (EBM3021P, manufactured by JSR Co., Ltd.) and 10 parts of talc (JM-209, manufactured by Asada Seifun Co., Ltd.) were kneaded, 97 parts of the kneaded mixture and 3 parts of the cyclized product A were further kneaded and then melt-kneaded by a twin-screw extruder at 220° C. to obtain 0.5 mm-square pellets of the resin composition.

Test pieces (3 mm in thickness×50 mm in width×80 mm in length) were obtained by injection molding with the resulting pellets. A urethane metallic coating material (RB-212, manufactured by Nippon Bee Chemical Co., Ltd.) and a urethane clear coating material (RB-288, manufactured by Nippon Bee Chemical Co., Ltd.) were prepared according the specification described by Nippon Bee Chemical Co., Ltd. The test pieces were coated with two urethane coating materials at thicknesses of 10 µm of RB-212 and 20 µm of RB-288, and 30 µm of RB-212 and 20 µm of RB-288, respectively. After drying at 80° C. for 30 minutes and then the test pieces were allowed to stand for 24 hours. The former test piece was subjected to the adhesion test, while the latter test piece was subjected to the solvent resistance test. The test results are shown in Table 2.

Example 2

In the same manner as in Example 1, except that the cyclized product B was used in place of the cyclized product A, the treatment was conducted. The results are shown in Table 2.

Example 3

In the same manner as in Example 1, except that the cyclized product C was used in place of the cyclized product A, the treatment was conducted. The results are shown in Table 2.

Example 4

In the same manner as in Example 1, except that the cyclized product D was used in place of the cyclized product A, the treatment was conducted. The results are shown in Table 2.

Comparative Example 1

In the same manner as in Example 1, except that the cyclized product A was not used, the treatment was conducted. The results are shown in Table 2.

Reference Example 5

In a three-necked flask equipped with a stirrer, a thermometer, reflux condenser, a water diversion pipe and a nitrogen gas introducing tube, 250 g of 4-methyl-4-cyclohexene-cis,cis-1,2-dicarboxylic anhydride, 118.4 g of propylene glycol, 20.8 g of pentaerythritol and 0.14 g of 12 tungsto (VI) phosphoric acid hydrate were charged and stirred while blowing a nitrogen gas, the reaction was conducted at 180° C. for 5 hours while removing water produced during the reaction and the unreacted monomer. After that, 0.1 g of 12 tungsto (VI) phosphoric acid hydrate was further added with stirring while blowing a nitrogen gas, and the reaction was conducted at 180° C. for 5 hours while removing water produced during the reaction and the unreacted monomer. After further adding 0.1 g of tungstophosphoric acid hydrate, the reaction temperature was raised to 200° C. and the pressure in the flask was gradually reduced to 5 mmHg or less for 1.5 hours, and then the reaction was conducted for 3 hours to obtain a polyester. The resulting polyester had a weight average molecular weight of 31,310.

Comparative Example 2

In the same manner as in Example 1, except that a polyester obtained in Example 5 was used in place of the cyclized product A, the treatment was conducted. The results are shown in Table 2.

Comparative Example 3

In the same manner as in Example 1, except that polyether (polyether H, manufactured by Mitsubishi Chemical Corporation) was used in place of the cyclized product A, the treatment was conducted. The results are shown in Table 2.

TABLE 2

|  | Examples | | | | Comparative Examples | | |
|---|---|---|---|---|---|---|---|
|  | 1 | 2 | 3 | 4 | 1 | 2 | 3 |
| Formulation of resin composition (parts) | | | | | | | |
| Hydrocarbon resin composition | 97 | 97 | 97 | 97 | 100 | 97 | 97 |
| Cyclized product A | 3 | — | — | — | — | — | — |
| Cyclized product B | — | 3 | — | — | — | — | — |
| Cyclized product C | — | — | 3 | — | — | — | — |
| Cyclized product D | — | — | — | 3 | — | — | — |
| Polyester | — | — | — | — | — | 3 | — |
| Polyether | — | — | — | — | — | — | 3 |
| Properties of coating film | | | | | | | |
| Adhesion properties (/100 squares) | 100 | 100 | 100 | 100 | 10 | 60 | 80 |
| Solvent resistance (seconds) | 200 | 200 | 250 | 210 | 30 | 80 | 170 |

Example 5

100 parts of an ethylene-propylene-ethylidene norbornene copolymer rubber was kneaded with 130 parts of carbon black (SEAST 112, manufactured by Tokai Carbon Co., Ltd.), 60 parts of process oil (Dyna Process PW380, manufactured by Idemitsu Kosan Co. Ltd.), 5 parts of zinc white No. 1, 1 part of stearic acid, 30 parts of calcium carbonate, 2 parts of a polycondensate of 2,2,2-trimethyl-1,2-dihydroquinoline (NOCRAC 224, manufactured by OUCH-ISHINKO CHEMICAL INDUSTRIAL CO., LTD.), 6 parts of a dehydrating agent (BESUTA PP, manufactured by Inoue Sekkai Kogyo Co., Ltd.) and 10 parts of a cyclized product A at 60° C. for 5 minutes using a Banbury mixer, and then mixed with 1.2 parts of sulfur (product passed through a 325 mesh sieve), 1 part of 2-mercaptobenzothiazole, 1 part of dibenzothiazyl disulfide, 0.75 parts of tetramethylthiuram disulfide and 0.5 parts of dipentamethylenethiuram tetrasulfide using a roll at 60° C. The resulting rubber composition was vulcanized at a press pressure of 9.8 MPa and a temperature of 160° C. for 15 minutes to obtain a test piece measuring 2 mm in thickness×15 cm×8 cm, which was cut into a size of 7.5 cm×4 cm at the center. The test piece was coated with a polyurethane coating material (Queen Beam 77B, manufactured by Vantico Company) using a brush so that the thickness of a dry coating film became 100 μm. The sheet coated with the material was cut into proper size, put in a gear oven and then heated at 180° C. for 18 minutes. Then, the sheet was subjected to an adhesion test due to peel strength of the coating material. The results are shown in Table 3.

Example 6

In the same manner as in Example 5, except that the cyclized product B was used in place of the cyclized product A, the treatment was conducted. The results are shown in Table 3.

Comparative Example 4

In the same manner as in Example5, except that the cyclized product A was not added, the treatment was conducted. The results are shown in Table 3.

Comparative Example 5

In the same manner as in Example 5, except that polyether (the above-mentioned polyether H) was used in place of the cyclized product A, the treatment was conducted. The results are shown in Table 3.

TABLE 3

|  | Examples | | Comparative Examples | |
|---|---|---|---|---|
|  | 5 | 6 | 4 | 5 |
| Formulation of rubber composition (parts) | | | | |
| Hydrocarbon rubber composition | 338.45 | 338.45 | 338.45 | 338.45 |
| Cyclized product A | 10 | — | — | — |
| Cyclized product B | — | 10 | — | — |
| Polyether | — | — | — | 10 |
| Properties of coating film | | | | |
| Peel strength (N/m) | 1570 | 1080 | 196 | 785 |
| State of peeled surface | Surface layer fracture | Surface layer fracture | Interfacial fracture | Surface layer fracture |

The moldings containing no modified cyclic structure-containing conjugated diene polymer of Comparative Examples 1 to 5 are inferior to coating of the covering material to the surface of the molding, while the moldings of Examples 1 to 6 are excellent in coating of the covering material to the surface of the molding.

INDUSTRIAL APPLICABILITY

In case of molding a composition obtained by adding the modifier for hydrocarbon polymer of the present invention in a hydrocarbon polymer, the resulting molding exhibits excellent coatabilities when covering agents such as adhesive and coating material are applied on the surface.

The invention claimed is:
1. A hydrocarbon polymer composition including at least one component selected from a group consisting of a polyethylene resin, a polypropylene resin, a polybutylene resin, an ethylene-propylene copolymer resin, an ethylene-propylene copolymer rubber, and an ethylene-propylene-eth- ylidene norbornene copolymer rubber, and a modifier for hydrocarbon polymer comprising, as an active component, a modified cyclic structure-containing conjugated diene polymer wherein an amount of an $\alpha,\beta$-ethylenically unsaturated carboxylic acid compound bonded by addition is from 0.1 to 20% by weight and a cyclization ratio is from 30 to 95%.

2. A hydrocarbon polymer composition including at least one component selected from a group consisting of a propylene homopolymer, an ethylene-propylene copolymer rubber, and an ethylene-propylene-ethylidene norbornene copolymer rubber; and a modifier for hydrocarbon polymer comprising, as an active component, a modified cyclic structure-containing conjugated diene polymer wherein an amount of an $\alpha,\beta$-ethylenically unsaturated carboxylic acid compound bonded by addition is from 0.1 to 20% by weight and a cyclization ratio is from 30 to 95%.

3. A hydrocarbon polymer composition according to claim 1, wherein a ratio of an acid anhydride group to a total amount of the $\alpha,\beta$-ethylenically unsaturated carboxylic acid compound is 60% or more by weight.

4. A molding comprising the hydrocarbon polymer composition according to claim 1.

5. The molding according to claim 4, which is coated with a covering material.

6. The molding according to claim 5, wherein the covering material contains a heat-hardening resin as a main component.

7. The molding according to claim 5, wherein the covering matenal is a coating material.

8. The molding according to claim 7, wherein the covering material is at least one material selected from a group consisting of an epoxy-based resin coating material, an acrylic-urethane-based resin coating material, a polyurethane-based coating material, an alkyd-melamine-based resin coating material, a polyester-melamine-based resin coating material, and a polyether-melamine-based resin coating material.

9. The molding according to claim 5, wherein the covering material is an adhesive.

10. The molding according to claim 9, wherein the adhesive is at least one adhesive selected from a group consisting of an epoxy-based adhesive, a urethane-based adhesive, an acrylic-based adhesive, and a cyano acrylate-based adhesive.

* * * * *